(No Model.)
H. McCOY.
DRAFT EQUALIZER.
No. 377,812. Patented Feb. 14, 1888.
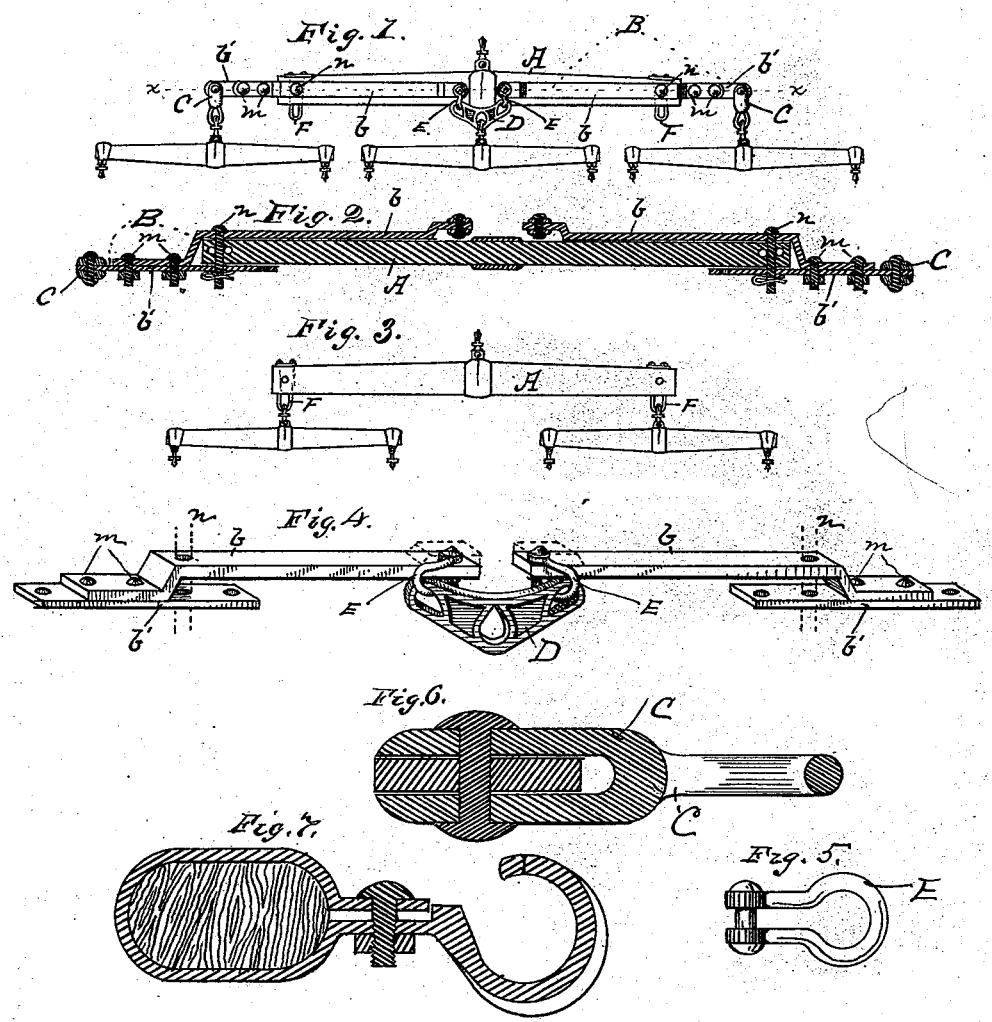

UNITED STATES PATENT OFFICE.

HAMILTON McCOY, OF INDIANAPOLIS, INDIANA.

DRAFT-EQUALIZER.

SPECIFICATION forming part of Letters Patent No. 377,812, dated February 14, 1888.

Application filed June 15, 1887. Serial No. 241,428. (No model.)

*To all whom it may concern:*

Be it known that I, HAMILTON MCCOY, a citizen of the United States, residing at Indianapolis, in the county of Marion and State of Indiana, have invented certain new and useful Improvements in Combined Double and Single Tree and Draft Equalizer; and I do hereby declare the following to be a full, clear, and exact description of the invention, such as will enable others skilled in the art to which it appertains to make and use the same.

The object of my invention is, first, to make a tripletree that will divide the draft-strain equally between three horses when working abreast; second, to make a tripletree that can be readily changed so as to divide the draft-strain among the three animals in proportion to the strength of each; third, to make a tripletree that can be easily and quickly changed into a doubletree; fourth, to construct the doubletree and attach the equalizing-levers in such a manner as to prevent the doubletree from splitting at the ends. These objects I accomplish by the mechanism illustrated in the accompanying drawings, in which—

Figure 1 is a top view of my complete draft-equalizer; Fig. 2, a vertical sectional view of same through the line $x$; Fig. 3, a top view of my equalizer with the levers and third singletree removed and the device converted into a doubletree. Fig. 4 is a front perspective view of the equalizing-levers, with all other parts removed, except the device for attaching the middle singletree; Fig. 5, a side view of one of the clevises used in attaching the middle singletree; Fig. 6, a vertical sectional view of the links for connecting the singletrees with the outer ends of the levers; Fig. 7, a vertical sectional view of the clip used on the singletrees, showing the manner of attaching it to the wood.

Similar letters refer to similar parts throughout the several views.

A is the doubletree, which will be attached to the load by means of my improved clip, which is fully described in Letters Patent issued to me on the 30th day of August, 1881.

B are two horizontal draft-levers pivoted to the opposite ends of the doubletree A. These levers are constructed in two sections—an upper and long section or plate, $b$, which is fastened to the short under section or plate, $b'$, by means of two bolts, $m$. The bolted end of the upper section, $b$, is bent down a distance equal to the thickness of the doubletree till it meets the short under section, $b'$. The upper plate being bent down in this manner allows the under plate to be made straight and to project under the end of the doubletree.

The levers B B are attached to the doubletree A by the pin $n$, which passes through a hole in the upper plate, $b$, of the lever and through the doubletree, and thence through a corresponding hole in the lower plate, $b'$. The inner ends of the levers B are twice the length of the outer ends, or nearly so, when all of the animals are pulling equally. When a difference in the strength of the animals, or any other circumstance, requires an unequal division, the adjustment is made by unbolting the two plates $b$ and $b'$, and sliding the under plate, $b$, which is made purposely long enough and provided with extra holes, either out or in, as the case may require. In order to do this, all of the holes in the lower plate, $b'$, are made exactly the same distance apart, and the holes in the corresponding end of the upper plate, $b$, including the two holes for the bolts and the hole for the pin $m$, are made to correspond exactly with the holes in the lower plate. By this arrangement the length of the outer end of the lever can be varied and the draft-strain divided among the animals, as circumstances may require.

The outer end of each lever is provided with a link, C, adapted to encircle the end of the lever, and is secured in place by a vertical pin or rivet. To each of the links C, I secure a singletree by means of my patent clips, previously referred to.

The inner ends of the equalizing-levers are connected to a draft-plate, D, by the small intermediate clevises, E. These clevises are slipped through eyes in the respective ends of the draft-plate, and are secured to the ends of the levers by clevis-pins running vertically through suitable holes in the levers.

The levers may be bent up at their inner ends, as shown in Figs. 1 and 2 and in dotted lines in Fig. 4, to keep the lower ends of the clevis-pins from striking the doubletree.

The draft-plate D has a central eye by which the middle singletree is attached. The doubletree is provided with extra U-shaped end hooks, F, which serve to attach the singletrees when it is desired to convert the tripletree into a doubletree. In this case the middle singletree is discarded, and the draft-levers may be allowed to remain, or they may be removed by withdrawing the pins $m$. By allowing the under plate, $b'$, to extend under the doubletree A the pin $m$ is given a bearing on both sides of the doubletree and obviates the danger of splitting the wood. The hooks F pass through the ends of the doubletree, and are additional preventives against the splitting of the doubletree. The bending of the levers, so as to bring the point of attachment of the outer animals below the upper face of the doubletree, holds the equalizer from dropping down against the animals' heels.

I am aware that draft-equalizers have been made in which the inner ends of two levers were connected to a singletree and were provided with a singletree on each of the outer ends; but I am not aware that the peculiar construction and arrangement as above described have ever before been attempted; and therefore

I claim—

1. In a draft-equalizer, the combination of the doubletree A, levers B, pivoted to the doubletree and constructed from two plates, an upper one, $b$, bent upwardly at its inner end, and at its outer end curved downwardly to meet the lower plate, $b'$, to which it is fastened by bolts or rivets, and the straight under plate, $b'$, having its inner end projecting under the doubletree to give support to the pin $m$, the intermediate draft-plate, D, connected to the levers by the clevises E, the link C, encircling the outer ends of the levers B, the U-shaped clevises F through the ends of the doubletree A, for the purposes specified, and the singletrees attached to the outer ends of the levers B and to the central draft-plate, all substantially as described and set forth.

2. The combination, with the doubletree A, of the levers B, made in two sections, the upper section, $b$, lying on top of the doubletree and having its outer end bent down to rest on the section $b'$, and the straight lower section, $b'$, projecting under the doubletree and provided with a series of equidistant holes corresponding in position with holes in the outer end of the upper section, adapting the two sections to be bolted together to form the levers B and allowing the outer ends of the levers to be varied in length to regulate the draft-strain, the central draft-plate, D, attached to the levers by clevises E, the link C on the ends of the levers, and the three singletrees attached thereto, substantially as described and specified.

3. The combination, with a doubletree, A, having two equalizing-levers pivoted on the top thereof and carrying three detachable singletrees, of the clevises F in the ends of the doubletree, each adapted to attach a singletree and allow the tripletree to be changed into a doubletree, as described and specified.

In testimony whereof I affix my signature in presence of two witnesses.

HAMILTON McCOY.

Witnesses:
MOSES MAY,
DANL. C. KLINE.